United States Patent
Tizzotti

(10) Patent No.: US 10,926,200 B2
(45) Date of Patent: *Feb. 23, 2021

(54) METHOD FOR TREATING SUSPENSIONS OF SOLID PARTICLES IN WATER USING AMPHOTERIC POLYMERS

(71) Applicant: S.P.C.M. SA, Andrezieux Boutheon (FR)

(72) Inventor: Morgan Tizzotti, Lyons (FR)

(73) Assignee: S.P.C.M. SA, Andrezieux Boutheon (FR)

(*) Notice: Subject to any disclaimer, the term of this patent is extended or adjusted under 35 U.S.C. 154(b) by 33 days.

This patent is subject to a terminal disclaimer.

(21) Appl. No.: 15/544,211

(22) PCT Filed: Jan. 28, 2016

(86) PCT No.: PCT/FR2016/050174
§ 371 (c)(1),
(2) Date: Jul. 17, 2017

(87) PCT Pub. No.: WO2016/128638
PCT Pub. Date: Aug. 18, 2016

(65) Prior Publication Data
US 2018/0264381 A1   Sep. 20, 2018

(30) Foreign Application Priority Data
Feb. 12, 2015  (FR) ...................... 1551153

(51) Int. Cl.
| | | |
|---|---|---|
| B01D 21/01 | (2006.01) | |
| C10G 1/04 | (2006.01) | |
| B03D 3/02 | (2006.01) | |
| B03D 3/06 | (2006.01) | |
| C02F 11/14 | (2019.01) | |
| C02F 1/56 | (2006.01) | |
| C08F 216/14 | (2006.01) | |
| C08F 220/54 | (2006.01) | |
| C08F 226/10 | (2006.01) | |
| C02F 103/10 | (2006.01) | |
| C02F 103/12 | (2006.01) | |

(52) U.S. Cl.
CPC ............ *B01D 21/01* (2013.01); *B03D 3/02* (2013.01); *B03D 3/06* (2013.01); *C02F 1/56* (2013.01); *C02F 11/14* (2013.01); *C10G 1/04* (2013.01); *C10G 1/045* (2013.01); *C02F 2103/10* (2013.01); *C02F 2103/12* (2013.01); *C08F 216/1458* (2013.01); *C08F 220/54* (2013.01); *C08F 226/10* (2013.01)

(58) Field of Classification Search
None
See application file for complete search history.

(56) References Cited

U.S. PATENT DOCUMENTS

| | | | |
|---|---|---|---|
| 4,347,140 A | 8/1982 | Condolios et al. | |
| 2007/0287815 A1 | 12/2007 | Gaillard et al. | |
| 2009/0020458 A1* | 1/2009 | Bozak ............... | B01D 17/0205 208/390 |
| 2010/0105976 A1* | 4/2010 | Poncet .................... | C02F 1/56 588/315 |

FOREIGN PATENT DOCUMENTS

| | | | |
|---|---|---|---|
| CA | 1273888 A | 9/1990 | |
| CA | 2407869 A1 | 12/2001 | |
| CA | 2515581 A1 | 7/2004 | |
| CA | 2682542 A1 | 4/2010 | |
| EP | 0082571 A1 | 6/1983 | |
| EP | 2203245 A1 | 7/2010 | |
| FR | 2879606 A1 * | 6/2006 | ............... C08F 2/10 |
| FR | 2879606 A1 | 6/2006 | |
| WO | 96/05146 A1 | 2/1996 | |
| WO | 2008/107492 A1 | 9/2008 | |

OTHER PUBLICATIONS

Machine translation of Rene et al. (FR Patent # 2879606), pp. 1-5.*
Mathur et al. (Journal of Colloid and Interface Science, 2002, 256, 1523-158) (Year: 2002).*
International Search Report (and English Translation thereof) and Written Opinion issued in PCT/FR2016/050174, dated Apr. 4, 2016.

* cited by examiner

*Primary Examiner* — Clare M Perrin
(74) *Attorney, Agent, or Firm* — Heslin Rothenberg Farley & Mesiti P.C.

(57) ABSTRACT

The invention relates to a method for treating an aqueous suspension of solid mineral particles arising from the extraction of ores, comprising the following steps: a soluble polymer is prepared in water, comprising:
at least one non-ionic monomer, selected from the group consisting of acrylamide; methacrylamide; N-monoderivatives of acrylamide; N-monoderivatives of methacrylamide; N,N-derivatives of acrylamide; N,N-derivatives of methacrylamide; acrylic esters; methacrylic esters; N-vinylformamide; and N-vinylpyrrolidone;
at least one anionic monomer representing between 10 and 70 mol %, selected from the group consisting of monomers having a carboxylic functional group and salts thereof; monomers having a sulphonic acid functional group and salts thereof; monomers having a phosphonic acid functional group and salts thereof;
at least one cationic monomer representing between 0.2 and 6 mol %, selected from the group consisting of diallyl dimethylammonium chloride, methacrylamidopropyltrimethylammonium chloride and acrylamidopropyltrimethylammonium chloride; adding said soluble polymer into the water having the aqueous suspension of solid particles. This method is particularly useful for treating residues resulting from the extraction of bituminous sand.

19 Claims, No Drawings

METHOD FOR TREATING SUSPENSIONS OF SOLID PARTICLES IN WATER USING AMPHOTERIC POLYMERS

CROSS REFERENCE TO RELATED APPLICATIONS

This application is a national stage filing under section 371 of International Application No. PCT/FR2016/050174, filed on Jan. 28, 2016, and published on Aug. 18, 2016 as WO 2016/128638, which claims priority to French Application No. 1551153, filed on Feb. 12, 2015. The entire contents of each of said applications are hereby incorporated herein by reference.

FIELD OF THE INVENTION

The invention relates to a method for treating a suspension of solid particles in water, such as mineral residues. This method comprises the step of placing the suspension of solid particles in water in contact with a particular amphoteric polymer, soluble in water. More precisely, the method consists of adding said amphoteric polymer into a thickener containing this suspension to be treated and/or during the transport of said suspension to a depositing area for its dehydration and its solidification or of adding said amphoteric polymer to said suspension then of carrying out a mechanical treatment, such as centrifugation, pressing or filtration.

HISTORY OF THE INVENTION

Suspensions of solid particles in water comprise all types of sludge, residues and waste materials. Suspensions may result from the processing of ores. This may be for example sludge or industrial residues and all products from washing and mine waste resulting from mining operations, such as for example coal mines, diamond mines, phosphate mines, metal (aluminum, platinum, iron, gold, copper, silver, etc.) mines. Suspensions may also result from sludge or extraction residues derived from the processing of bituminous sand. These suspensions of solid particles comprise generally organic and/or mineral particles, such as for example clays, sediments, sand, metal oxides, oil, etc. mixed with water.

The term "suspension" is used hereinafter and refers to suspensions of solid particles as described above.

The processing of these residues and other waste materials has become a technical, environmental, and public order problem.

The use of synthetic or natural polymers, such as coagulants and flocculants, to separate the solids from the liquid is a current practice.

For a long time, and even now, mineral sludge produced by physical or chemical treatment of ores has been stored in the open in lagoons, ponds, tailings dams or backfills in semi-liquid form. These large volumes of stored sludge therefore create a real hazard, in particular if the embankments fail.

Since the traditional storage solutions are clearly hazardous, increasing numbers of national regulations have been published, prohibiting the abandonment of these areas. The regulations also oblige restoration of these sites, namely the treatment and consolidation of the soil.

The improvement in chemical and mechanical treatments of residues or sludge is consequently an important challenge.

Various attempts have been made over recent decades to increase the rate of sedimentation of the residues in order to efficiently recycle the water and to reduce the volume of residue. The main physical treatments comprise centrifugation, filtration, electrophoresis, and electrocoagulation.

Furthermore, chemical methods are emerging. They comprise a method involving the addition of chemical products, such as sodium silicate, organic flocculants, inorganic coagulants, oxidizing and reducing agents, and more recently carbon dioxide.

In 1979-1980, Alsthom Atlantique and SNF (U.S. Pat. No. 4,347,140) developed a multiple-step flocculation system (superflocculation) specifically designed to treat the clay settling lagoons from phosphate production in Florida.

Suspension treatment has been studied continuously: in 1986 in accordance with the method described in CA 1273888, then in 1994 in WO 96/05146, in 2000 in CA 2407869 and in 2004 in CA 1515581.

In document CA 2682542, the method involves the addition of polymers modified by copolymerization and/or branching. Polymers with hydrophobic groups, which have also been studied, have shown an improvement in the treatment of suspensions.

Despite major advances over the last ten years, there is still a need to develop polymers which enable the rate and quantity of water released from the suspensions to be increased. An improvement of the physical characteristics of the dehydrated sludge produced is also sought.

SUMMARY OF THE INVENTION

The present invention meets the needs above through a method for the treatment of suspensions of solid particles in water using amphoteric polymers, soluble in water.

An amphoteric polymer is a polymer which comprises in its polymeric structure anionic functional groups carrying negative charges and cationic functional groups carrying positive charges.

The invention relates to a method for treating a suspension of solid particles in water, comprising the placing of said suspension into contact with a water-soluble polymer, said polymer being amphoteric and containing a small and well-defined proportion of cationic monomer.

According to the invention, it was surprisingly found that the use of these polymers improves the performance of treatments of suspensions, such as:
 the increase in the concentration of sludge at the outlet of a thickener or
 the dehydration step and the drying and solidification steps of the suspensions when discharged onto the ground or
 the mechanical treatment of the treated suspensions.

The use of these polymers increases the drainage, release of water and general dehydration of the suspensions. It also improves the mechanical properties of the materials obtained after separation of the water and the clarity of the aqueous fluid released (also known as liquor), which enables the clarified water to be reused and made immediately available for recirculating in the industrial plant. The treated suspension solidifies much more quickly, which leads to improved properties of the dry sludge.

DETAILED DESCRIPTION OF THE INVENTION

The invention relates to a method for treating an aqueous suspension of solid particles, according to which at least one water-soluble polymer is added to said suspension. The method is characterized in that said polymer comprises:
- at least one non-ionic monomer;
- at least one anionic monomer;
- at least one cationic monomer representing between 0.2 and 6 mol %.

More particularly, the invention relates to a method for treating an aqueous suspension of solid particles, comprising the following steps:
- a water-soluble polymer is prepared comprising:
  - at least one non-ionic monomer;
  - at least one anionic monomer;
  - at least one cationic monomer representing between 0.2 and 6 mol %.
- adding said water-soluble polymer into the aqueous suspension of solid particles.

Advantageously, this is a treatment of an aqueous suspension of solid mineral particles from the extraction of ores.

The at least one non-ionic monomer is advantageously selected from the group consisting of acrylamide; methacrylamide; N-monoderivatives of acrylamide; N-monoderivatives of methacrylamide; N,N-derivatives of acrylamide; N,N-derivatives of methacrylamide; acrylic esters; methacrylic esters; N-vinylformamide; and N-vinylpyrrolidone.

The at least one anionic monomer advantageously represents between 10 and 70 mol %. It is advantageously selected from the group consisting of monomers having a carboxylic functional group and salts thereof; monomers having a sulfonic acid functional group and salts thereof; monomers having a phosphonic acid functional group and salts thereof.

The at least one cationic monomer is advantageously selected from the group comprising diallyl dimethyl ammonium chloride (DADMAC), methacrylamido-propyl trimethyl ammonium chloride (MAPTAC) and acrylamido-propyl trimethyl ammonium chloride (APTAC). DADMAC is particularly preferred.

In a completely surprising way, the use of an amphoteric polymer containing a small and well-defined quantity of at least one cationic monomer combined with at least one non-ionic monomer and at least one anionic monomer enables the effective treatment of suspensions of solids. It is within this particular concentration range of cationic monomer and only within this range, and for this type of water-soluble polymer also comprising at least one non-ionic monomer and at least one anionic monomer, that the improvement of the treatment of the suspensions is significant.

The cationic monomer(s) may also be selected from the group comprising diallyldialkyl ammonium salts such as diallyl dimethyl ammonium chloride (DADMAC), the acidified or quaternized salts of dialkylaminoalkyl acrylates or methacrylates, in particular dialkylaminoethyl acrylate and dialkylaminoethyl methacrylate, the acidified or quaternized salts of dialkyl-aminoalkylacrylamides, such as for example acrylamido-propyl trimethyl ammonium chloride (APTAC), and the acidified or quaternized salts of dialkyl-aminoalkyl-methacrylamides, such as for example methacrylamido-propyl trimethyl ammonium chloride (MAPTAC).

The acidified salts are obtained by means known to a person skilled in the art, and notably by protonation. The quaternized salts are also obtained by means known to a person skilled in the art notably, by reaction with benzyl chloride, methyl chloride (MeCl), aryl, alkyl chlorides, or dialkylsulfates such as dimethylsulfate.

According to a preferred embodiment, the cationic monomer is selected from diallyldialkyl ammonium salts such as diallyl dimethyl ammonium chloride (DADMAC), the acidified or quaternized salts of dialkyl-aminoalkylacrylamides or methacrylamides, such as for example methacrylamido-propyl trimethyl ammonium chloride (MAPTAC) and acrylamido-propyl trimethyl ammonium chloride (APTAC).

Of particular preference are diallyl dimethyl ammonium chloride (DADMAC), methacrylamido-propyl trimethyl ammonium chloride (MAPTAC) and acrylamido-propyl trimethyl ammonium chloride (APTAC). DADMAC is even more particularly preferred.

One or more cationic monomers may be used for the manufacture of the amphoteric polymer according to the invention.

The total quantity of cationic monomer is between 0.2 and 6 mol %.

The unit "mol %" corresponds to the molar percentage of monomer (non-ionic or anionic or cationic) relative to the total number of moles of monomer used in the manufacture of the polymer.

According to a preferred embodiment, the total quantity of cationic monomer is greater than or equal to 0.5 mol %. It is also preferentially lower than or equal to 5 mol %.

When the single cationic monomer is DADMAC, its quantity is preferably between 1 and 5 mol %, preferably between 3 and 5 mol %.

When the single cationic monomer is either APTAC or MAPTAC, its quantity is preferably between 0.5 and 3 mol %, preferably between 0.5 and 2 mol %.

As already indicated, the non-ionic monomer(s) are preferably selected from the group consisting of acrylamide; methacrylamide; N-monoderivatives of acrylamide such as for example N-isopropylacrylamide; N-monoderivatives of methacrylamide; N,N-derivatives of acrylamide, such as for example N,N-dimethylacrylamide; N,N-derivatives of methacrylamide; acrylic esters; methacrylic esters; N-vinylformamide; and N-vinylpyrrolidone. The particularly preferred non-ionic monomer is acrylamide.

The polymer according to the invention comprises preferably a quantity of non-ionic monomers of at least 30% by mole, preferably of at least 45% by mole.

As already indicated, the anionic monomer(s) are preferably selected from the group consisting of monomers having a carboxylic functional group and salts thereof; monomers having a sulfonic acid functional group and salts thereof, monomers having a phosphonic acid functional group and salts thereof. They are for example acrylic acid, methacrylic acid, itaconic acid, crotonic acid, maleic acid, fumaric acid, 2-acrylamido-2-methylpropanesulfonic acid, vinylsulfonic acid, vinylphosphonic acid, allylsulfonic acid, allylphosphonic acid, styrenesulfonic acid, and the corresponding water-soluble salts thereof. The water-soluble salts of the anionic monomers above are typically alkali metal salts, alkaline earth metal salts and ammonium salts. The particularly preferred anionic monomers are acrylic acid, 2-acrylamido-2-methylpropanesulfonic acid and the corresponding salts thereof.

The polymer according to the invention comprises preferably a quantity of anionic monomers of between 10 and 70 mol %, preferably between 25 and 55 mol %.

Monomers with a hydrophobic nature may also be used in the preparation of the water-soluble polymer used in the method of the invention. They are preferably selected from the group consisting of (meth)acrylic acid esters having an alkyl, arylalkyl or ethoxylated chain and (meth)acrylamide derivatives having an alkyl, arylalkyl or dialkyl chain.

When a monomer having a hydrophobic nature is used for the preparation of the water-soluble polymer, its quantity lies advantageously within the range between 0.001 and 3 mol % relative to the total quantity of monomers.

The molecular weight of the polymer according to the invention is preferably between 3 and 40 million g/mol and more preferably between 5 and 30 million g/mol.

The water-soluble polymer may also be branched. Branching can preferably be carried out during the polymerization of the monomers in the presence of a branching/cross-linking agent or optionally a polyfunctional transfer agent. A non-exhaustive list of branching/cross-linking agents comprises: methylene-bi-acrylamide (MBA), ethylene glycol diacrylate, polyethyleneglycol dimethacrylate, vinyloxyethyl acrylate, vinyloxyethyl methacrylate, triallylamine, glyoxal, glycidyl ether-type compounds such as ethylene glycol diglycidyl ether, compounds with at least one epoxy functional group, trimercaptotriazine, polyvinyl alcohols, polyvinylamines.

The quantity of branching/cross-linking agent in the monomer mixture is less than 4% by weight relative to the monomer content.

The polymerization method may be carried out according to any one of the polymerization techniques well known to a person skilled in the art: solution polymerization, suspension polymerization, gel polymerization, precipitation polymerization, emulsion polymerization (aqueous or inverse) optionally followed by a spray-drying step, suspension polymerization, micellar polymerization optionally followed by a precipitation step. Post-hydrolysis or co-hydrolysis of the polymer of the invention is possible as is known to a person skilled in the art.

Polymerization is generally a free-radical polymerization preferably by inverse emulsion polymerization or gel polymerization. By free-radical polymerization, we include free-radical polymerization by means of UV initiators, azo initiators, redox or thermal initiators as well as controlled radical polymerization (CRP) or matrix polymerization techniques.

As already mentioned, the invention relates to a method for the treatment of suspensions of solid particles in water. It involves mixing the suspension with the water-soluble polymer of the invention.

Such a treatment may be carried out in a thickener, which is a holding area, generally in the form of a section of tube several meters in diameter with a conical bottom into which particles can settle. According to a specific embodiment, the aqueous suspension is transported through a pipe to a thickener and the polymer is added into said pipe.

According to another specific embodiment, the polymer is added into the thickener which already contains the suspension to be treated. In a typical mineral treatment operation, the suspensions are often concentrated in a thickener. This results in a sludge of higher density being obtained which leaves by the base of the thickener, and an aqueous fluid released from the treated suspension (known as liquor) which leaves by the overflow at the top of the thickener. The addition of the polymer increases the concentration of the sludge and increases the clarity of the liquor.

According to another specific embodiment, the polymer is added to the suspension of particles during the transport of said suspension to a depositing area. Preferably, the polymer is added into the pipe which transports said suspension to a depositing area. It is over this depositing area that the treated suspension is spread with a view to its dehydration and solidification. The depositing areas may be open, such as for example a non-bounded area of ground, or closed, such as for example a lagoon, a unit.

One example of these treatments during the transport of the suspension is the spreading of the suspension treated with the polymer according to the invention over the ground with a view to its dehydration and solidification then the spreading of a second layer of treated suspension over the first solidified layer. Another example is the continuous spreading of the suspension treated with the polymer according to the invention such that the treated suspension continuously falls onto the suspension previously discharged into the depositing area, thus forming a heap of treated material from which the water is extracted.

According to another specific embodiment, the water-soluble polymer is added to the suspension, then a mechanical treatment is carried out, such as centrifugation, pressing, or filtration.

The water-soluble polymer may be added simultaneously in the various stages of the treatment of the suspension, that is to say for example into the pipe transporting the suspension to a thickener and into the sludge leaving the thickener which will be led either to a depositing area, or to a mechanical treatment apparatus.

The polymer may be added in liquid form or solid form. The polymer may be added in the form of an emulsion (water in oil), a suspension, a powder, or a dispersion of the polymer in oil. The polymer is preferably added in the form of an aqueous solution.

When the polymer is added in the form of a solid, it may be partially or fully dissolved in water using a polymer preparation unit such as the Polymer Slicing Unit (PSU) disclosed in document EP 2203245.

According to another specific embodiment, the water-soluble polymer is added to the suspension in combination with another synthetic or natural polymer. These polymers may be added simultaneously or separately. The other polymer may be water-soluble or water-swellable. It may be a dispersant, coagulant or a flocculant.

According to another specific embodiment, the polymer according to the invention is added to the suspension in combination with a salt such as calcium and/or magnesium salts. The polymer and salt may be added simultaneously or separately. The salts may be inorganic or organic. Suitable salts comprise calcium chloride, calcium acetate, calcium sulfate, calcium nitrate, calcium hydroxide, calcium carbonate, magnesium chloride, magnesium acetate, magnesium sulfate, magnesium nitrate, magnesium hydroxide, magnesium carbonate, calcium formate, calcium gluconate, calcium propionate, tricalcium phosphate and calcium succinate.

According to the invention, the quantity (proportion) of polymer added is between 50 and 5000 g per metric ton of dry solids of the suspension, preferably between 250 and 2000 g/t and more preferably between 500 and 1500 g/t, depending on the nature and composition of the suspensions to be treated.

According to the invention, the method using the polymer described in the invention enables a suspension of solid particles and more particularly mineral particles to be effectively treated.

Suspensions of solid particles in water comprise all types of sludge, residues and waste materials. Suspensions result from ore extraction and are in the form of suspensions of mineral particles. They may for example correspond to sludge or industrial residues and all products from washing and mine waste resulting from mining operations, such as for example coal mines, diamond mines, phosphate mines, metal (aluminum, platinum, iron, gold, copper, silver, etc.) mines. Suspensions may also result from the extraction of bituminous sand, for example sludge or extraction residues derived from the treatment of bituminous sand. These suspensions generally comprise organic and/or mineral particles, such as for example clays, sediments, sand, metal oxides, oil, etc. mixed with water.

Generally, the suspensions of solid particles are concentrated and contain between 5% and 60% by weight of solids, preferably between 20 and 50% by weight of solids, relative to the total weight of said suspensions.

The method according to the invention is particularly useful for the treatment of residues from the extraction of bituminous sand: residues known as "fines" or "fine tailings", that is to say containing a large quantity of clays, and for the treatment of fine residues known as Mature Fine Tailings (MFT), that is to say these same residues after a few years of sedimentation, and containing an even greater quantity of clays. The method according to the invention may also be used to treat residues known as "fresh", that is to say coming directly from the operation of separating the bitumen and the soil from which it is extracted.

According to a particular embodiment of the invention, the aqueous suspension of solid particles is a fine residue known as Mature Fine Tailings (MFT), from the extraction of bituminous sand.

The treatment of bituminous sand residues has recently become a growing problem in Canada. The tailings are sent to tailings ponds or thickeners for subsequent water management. The bituminous sand residues are alkaline aqueous suspensions which contain unrecovered residual bitumen, salts, soluble organic compounds, sand and clay. The residues are sent to tailings ponds for storage.

Tailings ponds are tightly regulated by the Canadian government. It takes two to four barrels of water per barrel of oil produced by the bituminous sand exploitation process. When the suspension of residues is evacuated to the tailings ponds, the large solid particles such as sand separate by gravity whereas the water and fine solid particles, such as clays, remain in the form of suspensions in the tailings pond. A layer of Mature Fine Tailings (MFT) develops after two to three years. The MFT consolidate very slowly. It is estimated that the complete sedimentation process without any treatment takes almost a century.

The use of the polymer described in the invention enables the MFT to be treated in just a few days. They also enable the drainage, release of water and general dehydration of the MFT to be increased. They also improve the mechanical properties of the materials obtained after separation of the water and the clarity of the aqueous fluid released (also known as liquor), which enables the clarified water to be reused and made immediately available for recirculating in the industrial plant, typically for the step of separating the bitumen from the soil from which it is extracted.

The following examples are provided by way of illustration only of the subject matter of the invention, without limiting it in any way whatsoever.

Example 1—Preparation of the Polymer

A 1.5 L reactor equipped with a mechanical stirrer, a thermometer and a nitrogen inlet is loaded with distilled water, acrylamide (AM), acrylic acid (AA) and cationic monomer according to the following composition:

Acrylamide: (70–X) mol %.

Acrylic acid: 30 mol %.

Cationic monomer: X mol %.

Various cationic monomers have been tested, and for each of them, their concentration X was varied.

The mixture obtained is homogenized then cooled, neutralized with sodium hydroxide to pH=7.6-7.7 and finally degassed under a stream of nitrogen. Polymerization is then initiated using a redox system (initiator). The resulting gel, obtained after polymerization, is then ground and dried in a drying oven so as to obtain a powder.

The various polymers prepared are all water-soluble polymers with high molecular weights of between 10 and 12 million g/mol. They are listed in Table 1 below:

TABLE 1

Cationic monomer nature and concentration by polymer

| Polymer | Cationic monomer | Mol % |
| --- | --- | --- |
| X | none | 0 |
| A | APTAC | 0.5 |
| B | APTAC | 1 |
| C | APTAC | 1.5 |
| D | APTAC | 2 |
| E | APTAC | 3 |
| F | APTAC | 5 |
| G | APTAC | 7.5 |
| H | MAPTAC | 0.5 |
| I | MAPTAC | 1 |
| J | MAPTAC | 1.5 |
| K | MAPTAC | 2 |
| L | MAPTAC | 3 |
| M | MAPTAC | 5 |
| N | MAPTAC | 7.5 |
| O | DADMAC | 0.5 |
| P | DADMAC | 1 |
| Q | DADMAC | 1.5 |
| R | DADMAC | 2 |
| S | DADMAC | 3 |
| T | DADMAC | 5 |
| U | DADMAC | 7.5 |

APTAC: acrylamido-propyl trimethyl ammonium chloride
MAPTAC: methylacrylamido-propyl trimethyl ammonium chloride
DADMAC: diallyl dimethyl ammonium chloride Example 2—Flocculation of Sludge 1 (MFT 1)

Polymers X and A to U are dissolved in tap water in order to obtain aqueous solutions having a concentration of 0.4% by weight of polymer relative to the total weight of the solution. All the solutions are mechanically stirred at 500 rpm until the polymers are completely dissolved and clear and homogeneous solutions are obtained.

Flocculation tests are carried out on a suspension of mature fine tailings (MFT) from the extraction of bituminous sand having a solids content of 33.7% by weight.

For each test, the appropriate volume of polymer solution is added to 200 g of MFT then the complete mixture is manually mixed until flocculation and an optimum release of water is observed. The results are gathered in Table 2 below:

TABLE 2

Performances of polymers A to U in terms of net release of water in MFT 1.

| Polymer | Polymer proportion (kg/dry metric ton) | Released water (mL) 30 min | 1 h | 24 h | NRW 24 h |
|---|---|---|---|---|---|
| X | 1.14 | 12.9 | 15.6 | 22 | 2 |
| A | 1.14 | 19 | 22.2 | 28.6 | 8.6 |
| B | 1.19 | 19.3 | 22.9 | 29.9 | 8.9 |
| C | 1.31 | 18.6 | 23.4 | 32.3 | 9.3 |
| D | 1.42 | 19.1 | 23.4 | 32.3 | 9.3 |
| E | 1.65 | 24.6 | 29.3 | 34.9 | 5.9 |
| F | 2.16 | 28.7 | 34.8 | 43 | 5 |
| G | No flocculation regardless of proportion | | | | |
| H | 1.14 | 17.8 | 22.9 | 27.2 | 7.2 |
| I | 1.14 | 18.8 | 23.1 | 28.2 | 8.2 |
| J | 1.19 | 15.4 | 21.2 | 27.6 | 6.6 |
| K | 1.31 | 19.2 | 24.0 | 29.4 | 6.4 |
| L | 1.42 | 20.6 | 25.5 | 31.4 | 6.4 |
| M | 1.76 | 22.5 | 28.3 | 36.3 | 5.3 |
| N | 3.70 | 56.3 | 61.2 | 66.5 | 1.5 |
| O | 1.14 | 13.2 | 17.3 | 25 | 5 |
| P | 1.14 | 17.1 | 20.9 | 28.7 | 8.7 |
| Q | 1.19 | 18.7 | 22.8 | 30.4 | 9.4 |
| R | 1.19 | 19.9 | 23.3 | 28.8 | 7.8 |
| S | 1.31 | 25.3 | 29 | 35.1 | 12.1 |
| T | 1.48 | 26.7 | 30.9 | 37.6 | 11.6 |
| U | 1.99 | 27.9 | 32.7 | 40.8 | 5.8 |

NRW = Net release of water. It corresponds to the total quantity of water collected during the flocculation test minus the quantity of water unduly added during the incorporation of the aqueous polymeric solution into the suspension.

The results of these experiments clearly show that the presence in the amphoteric polymer of 0.5 mol % of MAPTAC, APTAC or DADMAC monomer enables the quantity of water released to be improved relative to the anionic polymer X. This performance is improved by further increasing the quantity of cationic monomer, up until a certain concentration of between 6 and 7 mol %, beyond which the performances decrease significantly. Too great a proportion of polymer may be problematic for an industrial application for which the user wishes to optimize its polymer consumption.

Example 3—Flocculation of Sludge 2 (MFT 2)

Polymers X and A to U are dissolved in tap water in order to obtain aqueous solutions having a concentration of 0.4% by weight of polymer relative to the total weight of the solution. All the solutions are mechanically stirred at 500 rpm until the polymers are completely dissolved and clear and homogeneous solutions are obtained.

Flocculation tests are carried out on a second suspension of mature fine tailings (MFT) from the extraction of bituminous sand having a solids content of 35.1% by weight.

For each test, the appropriate volume of polymer solution is added to 200 g of MFT then the complete mixture is manually mixed until flocculation and an optimized release of water is observed.

The results are gathered in Table 3 below:

TABLE 3

Performances of polymers A to U in terms of net release of water in MFT 2.

| Polymer | Polymer proportion (kg/dry metric ton) | Released water (mL) 30 min | 1 h | 24 h | NRW 24 h |
|---|---|---|---|---|---|
| X | 1.06 | 10.8 | 15 | 22.2 | 2.2 |
| A | 1.06 | 14.8 | 19.9 | 26.7 | 6.7 |
| B | 1.11 | 17.2 | 21.4 | 30.1 | 9.1 |
| C | 1.16 | 15.5 | 20.8 | 29.4 | 7.4 |
| D | 1.27 | 19.8 | 25.5 | 32.3 | 8.3 |
| E | 1.43 | 23.0 | 29.6 | 36.1 | 9.1 |
| F | 1.80 | 22.4 | 29.4 | 37.5 | 3.5 |
| G | No flocculation regardless of proportion | | | | |
| H | 1.11 | 16.1 | 20.4 | 26.9 | 5.9 |
| I | 1.11 | 16.4 | 19.9 | 26.8 | 5.8 |
| J | 1.16 | 14.8 | 22.0 | 28.2 | 6.2 |
| K | 1.22 | 15.3 | 21.3 | 30.4 | 7.4 |
| L | 1.37 | 19.7 | 25.1 | 33.5 | 7.5 |
| M | 1.80 | 22.9 | 35.2 | 37.8 | 3.8 |
| N | 3.81 | 54.6 | 63.8 | 73.1 | 1.1 |
| O | 1.00 | 13.0 | 17.8 | 26.6 | 7.6 |
| P | 1.06 | 13.5 | 19.2 | 28.0 | 8.0 |

TABLE 3-continued

Performances of polymers A to
U in terms of net release of water in MFT 2.

| Polymer | Polymer proportion (kg/dry metric ton) | Released water (mL) | | | NRW 24 h |
|---|---|---|---|---|---|
| | | 30 min | 1 h | 24 h | |
| Q | 1.06 | 14.8 | 18.9 | 28.3 | 8.3 |
| R | 1.11 | 16.4 | 20.7 | 29.7 | 8.7 |
| S | 1.16 | 15.8 | 21.0 | 29.2 | 7.2 |
| T | 1.37 | 19.7 | 28.0 | 34.6 | 8.6 |
| U | 1.85 | 25.4 | 29.5 | 39.1 | 4.1 |

The results of these experiments clearly show for a second MFT-type suspension, the presence in the amphoteric polymer of 0.5 mol % MAPTAC, APTAC or DADMAC monomer enables the quantity of water released to be improved relative to the anionic polymer X. This performance is improved by further increasing the quantity of cationic monomer, up until a certain concentration of between 6 and 7 mol %, beyond which the performances decrease significantly.

The invention claimed is:

1. A method for treating an aqueous suspension of solid mineral particles arising from the extraction of ores, comprising adding into the aqueous suspension of solid mineral particles a water-soluble polymer, said water-soluble polymer comprising:
   at least one non-ionic monomer selected from the group consisting of acrylamide; methacrylamide; N-monoderivatives of acrylamide; N-monoderivatives of methacrylamide; N,N-derivatives of acrylamide; N,N-derivatives of methacrylamide; acrylic esters; methacrylic esters; N-vinylformamide; and N-vinylpyrrolidone;
   at least one anionic monomer representing between 10 and 70 mol %, selected from the group consisting of monomers having a carboxylic functional group and salts thereof; monomers having a sulfonic acid functional group and salts thereof, monomers having a phosphonic acid functional group and salts thereof; and
   at least one cationic monomer representing between 0.2 and 6 mol %, selected from the group consisting of diallyldimethylammonium chloride, methacrylamidopropyl trimethyl ammonium chloride and acrylamidopropyl trimethyl ammonium chloride,
wherein the suspension is MFT resulting from the extraction of bituminous sand.

2. A method according to claim 1, wherein the quantity of cationic monomer is between 0.5 and 5 mol %.

3. A method according to claim 2, wherein the cationic monomer is diallyldimethyl ammonium chloride.

4. A method according to claim 2, wherein the polymer comprises a quantity of non-ionic monomers of at least 30 mol %.

5. A method according to claim 4, wherein the anionic monomer of the polymer is selected from the group consisting of acrylic acid, methacrylic acid, itaconic acid, crotonic acid, maleic acid, fumaric acid, 2-acrylamido-2-methylpropanesulfonic acid, vinylsulfonic acid, vinylphosphonic acid, allylsulfonic acid, allylphosphonic acid, styrenesulfonic acid, and the water-soluble salts thereof.

6. A method according to claim 1, wherein the cationic monomer is diallyldimethyl ammonium chloride.

7. A method according to claim 1, wherein the polymer comprises a quantity of non-ionic monomers of at least 30 mol %.

8. A method according to claim 7, wherein the quantity of cationic monomer is between 0.5 and 5 mol %, and wherein the cationic monomer is diallyldimethyl ammonium chloride.

9. A method according to claim 1, wherein the polymer has a molecular weight of between 3 and 40 million g/mol.

10. A method according to claim 1, wherein a quantity of polymer is added of between 50 and 5000 g per metric ton of dry solids of suspension.

11. A method according to claim 1, wherein the aqueous suspension is transported by means of a pipe to a depositing area and wherein the polymer is added into said pipe.

12. A method according to claim 1, wherein the polymer comprises a single cationic monomer, diallyldimethyl ammonium chloride, representing between 1 and 5 mol %.

13. A method according to claim 1, wherein the polymer comprises a single cationic monomer, acrylamidopropyltrimethyl ammonium chloride, representing between 0.5 and 3 mol %.

14. A method according to claim 1, wherein the polymer comprises a single cationic monomer, methacrylamidopropyl trimethyl ammonium chloride, representing between 0.5 and 3 mol %.

15. A method according to claim 1, wherein the non-ionic monomer of the polymer is acrylamide representing at least 45 mol %.

16. A method according to claim 1, wherein the anionic monomer of the polymer is selected from the group consisting of acrylic acid, methacrylic acid, itaconic acid, crotonic acid, maleic acid, fumaric acid, 2-acrylamido-2-methylpropanesulfonic acid, vinylsulfonic acid, vinylphosphonic acid, allylsulfonic acid, allylphosphonic acid, styrenesulfonic acid, and the water-soluble salts thereof.

17. A method according to claim 1, wherein the quantity of polymer added is between 250 and 2000 g per metric ton of dry solids of the aqueous suspension of particles arising from the extraction of ores.

18. A method according to claim 1, wherein the cationic monomers in the polymer comprise:
   diallyldimethyl ammonium chloride, representing between 1 and 5 mol %; and/or
   acrylamidopropyltrimethyl ammonium chloride, representing between 0.5 and 3 mol %; and/or
   methacrylamidopropyl trimethyl ammonium chloride, representing between 0.5 and 3 mol %.

19. A method according to claim 18, wherein the polymer comprises a quantity of non-ionic monomers of at least 30 mol %, and the anionic monomer of the polymer is selected from the group consisting of acrylic acid, methacrylic acid, itaconic acid, crotonic acid, maleic acid, fumaric acid, 2-acrylamido-2-methylpropanesulfonic acid, vinylsulfonic acid, vinylphosphonic acid, allylsulfonic acid, allylphosphonic acid, styrenesulfonic acid, and the water-soluble salts thereof.

* * * * *